US012757170B2

(12) United States Patent
Chen

(10) Patent No.: US 12,757,170 B2
(45) Date of Patent: Oct. 6, 2026

(54) BANDWIDTH SELECTION METHOD AND BASE STATION FOR CITIZENS BROADBAND RADIO SERVICE

(71) Applicant: Sercomm Corporation, Taipei (TW)

(72) Inventor: Xiaoan Chen, Jiangsu (CN)

(73) Assignee: Sercomm Corporation, Taipei (TW)

( * ) Notice: Subject to any disclaimer, the term of this patent is extended or adjusted under 35 U.S.C. 154(b) by 306 days.

(21) Appl. No.: 18/655,313

(22) Filed: May 5, 2024

(65) Prior Publication Data

US 2024/0389074 A1 Nov. 21, 2024

(30) Foreign Application Priority Data

May 18, 2023 (CN) ........................ 202310565340.8

(51) Int. Cl.
*H04W 72/02* (2009.01)
*H04W 72/0453* (2023.01)
*H04W 72/0457* (2023.01)
*H04W 72/563* (2023.01)

(52) U.S. Cl.
CPC ....... *H04W 72/02* (2013.01); *H04W 72/0453* (2013.01); *H04W 72/0457* (2023.01); *H04W 72/563* (2023.01)

(58) Field of Classification Search
CPC ............... H04W 72/02; H04W 72/563; H04W 72/0457; H04W 72/0453
USPC .......................................................... 370/329
See application file for complete search history.

(56) References Cited

U.S. PATENT DOCUMENTS

2016/0330743 A1* 11/2016 Das ......................... H04W 4/24
2017/0295497 A1* 10/2017 Macmullan ........... H04W 16/14
2017/0295578 A1* 10/2017 Khoshnevisan ...... H04L 5/0032
2019/0028182 A1* 1/2019 Smyth ................... H04W 24/08
2022/0240258 A1* 7/2022 Sevindik ............. H04W 72/541
(Continued)

FOREIGN PATENT DOCUMENTS

CN 102227932 10/2011
CN 110035438 7/2019
(Continued)

OTHER PUBLICATIONS

"Office Action of China Counterpart Application", issued on Sep. 5, 2025, p. 1-p. 10.
(Continued)

*Primary Examiner* — Mark G. Pannell
(74) *Attorney, Agent, or Firm* — JCIPRNET

(57) ABSTRACT

Disclosed is a bandwidth selection method and a base station for a citizens broadband radio service. The bandwidth selection method includes the following steps. A spectrum resource configuration is received from a spectrum access system. The spectrum resource configuration indicates at least one available frequency band, and the at least one available frequency band includes a priority access licensed frequency band or a general authorized access frequency band. A selected bandwidth in a spectrum of the citizens broadband radio service is determined as a working bandwidth of the base station. The selected bandwidth includes a part or all of the available frequency band. A candidate frequency band is selected from the available frequency band in the selected bandwidth. The candidate frequency band is configured to activate a bandwidth part.

26 Claims, 5 Drawing Sheets

(56) References Cited

U.S. PATENT DOCUMENTS

| | | | | |
|---|---|---|---|---|
| 2022/0256644 | A1* | 8/2022 | Hafeez | H04W 28/0864 |
| 2022/0386314 | A1* | 12/2022 | Mukherjee | H04W 52/38 |
| 2022/0400487 | A1* | 12/2022 | Sevindik | H04W 72/0453 |
| 2023/0104652 | A1* | 4/2023 | Furuichi | H04W 72/0453<br>370/329 |
| 2023/0199820 | A1* | 6/2023 | Balasubramanian | H04W 28/0862<br>370/329 |
| 2023/0262715 | A1* | 8/2023 | Sevindik | H04W 72/1215<br>370/329 |
| 2024/0032005 | A1* | 1/2024 | Srivastava | H04W 72/56 |

FOREIGN PATENT DOCUMENTS

| | | |
|---|---|---|
| CN | 111095965 | 5/2020 |
| CN | 114071478 | 2/2022 |
| CN | 115348586 | 11/2022 |
| WO | 2022002228 | 1/2022 |

OTHER PUBLICATIONS

Federated Wireless, "CBRS Spectrum Sharing Model in US", 3GPP TSG RAN Meeting#69, RP-151457, Phoenix, AZ, Sep. 14-16, 2015.

* cited by examiner

BANDWIDTH SELECTION METHOD AND BASE STATION FOR CITIZENS BROADBAND RADIO SERVICE

CROSS-REFERENCE TO RELATED APPLICATION

This application claims the priority benefit of China application serial no. 202310565340.8, filed on May 18, 2023. The entirety of the above-mentioned patent application is hereby incorporated by reference herein and made a part of this specification.

BACKGROUND

Technical Field

The disclosure relates to a wireless communication technology, and in particular to a bandwidth selection method and a base station for a citizens broadband radio service.

Description of Related Art

The citizens broadband radio service (CBRS) is an open spectrum resource between 3550 and 3700 megahertz (MHz) in the U.S., and the spectrum resource corresponds to the n48 frequency band for 5G communications. The CBRS spectrum resource includes basic channels (e.g., 10, 20, and 40 MHz) of the frequency bands for incumbent use, the priority access licensed (PAL) frequency bands, and the general authorized access (GAA) frequency bands, as shown in FIG. 1. A user authorized to use PAL frequency bands may obtain a PAL frequency band of up to 40 MHz. A general user may obtain one or more GAA frequency bands. Usually, users that are not authorized to use PAL frequency bands may obtain one or more GAA frequency bands, a sum of which being no more than 80 MHz.

In the CBRS system, the spectrum resource available for users include multiple non-contiguous frequency bands, and the allocation of these frequency bands is often not fixed. A multi-cell or a carrier-aggregation technology needs to be adopted for a base station to effectively utilize these frequency bands. Compared to adopting a single-cell technology, the costs of the hardware and deployment of the base station increase.

Therefore, how to realize the effective utilization of multiple non-contiguous frequency bands in a single cell is one of the important subjects in the art.

SUMMARY

The disclosure provides a bandwidth selection method and a base station for a citizens broadband radio service (CBRS) so as to effectively utilize non-contiguous frequency bands of a CBRS system.

The disclosure relates to a bandwidth selection method for the citizens broadband radio service. The bandwidth selection method is suitable for a base station and includes the following steps. A spectrum resource configuration is received from a spectrum access system. The spectrum resource configuration indicates at least one available frequency band, and the at least one available frequency band includes a priority access licensed frequency band or a general authorized access frequency band. A selected bandwidth in a spectrum of the citizens broadband radio service is determined as a working bandwidth of the base station. The selected bandwidth includes a part or all of the available frequency band. A candidate frequency band is selected from the available frequency band in the selected bandwidth. The candidate frequency band is configured to activate a bandwidth part.

The disclosure relates to a base station including a transceiver and a processor. The transceiver receives a spectrum resource configuration from a spectrum access system, wherein the spectrum resource configuration indicates at least one available frequency band, and the at least one available frequency band comprises a priority access licensed frequency band or a general authorized access frequency band. The processor is coupled to the transceiver and configured to determine a selected bandwidth in a spectrum of the citizens broadband radio service as a working bandwidth of the base station. The selected bandwidth includes a part or all of the available frequency band. The processor is also configured to select a candidate frequency band from the available frequency band in the selected bandwidth. The candidate frequency band is configured to activate a bandwidth part.

Based on the above, the base station of the disclosure utilizes an existing multi-part bandwidth technology of the 5G standard to realize the effective utilization of a CBRS spectrum resource. Thus, the disclosure may reduce the costs of a hardware and deployment of the base station.

DESCRIPTION OF THE EMBODIMENTS

Reference will now be made in detail to the exemplary embodiments of the disclosure, examples of which are illustrated in the accompanying drawings. Wherever possible, the same reference labels will be used throughout the drawings and the description to refer to the same or like parts.

Figure 2:
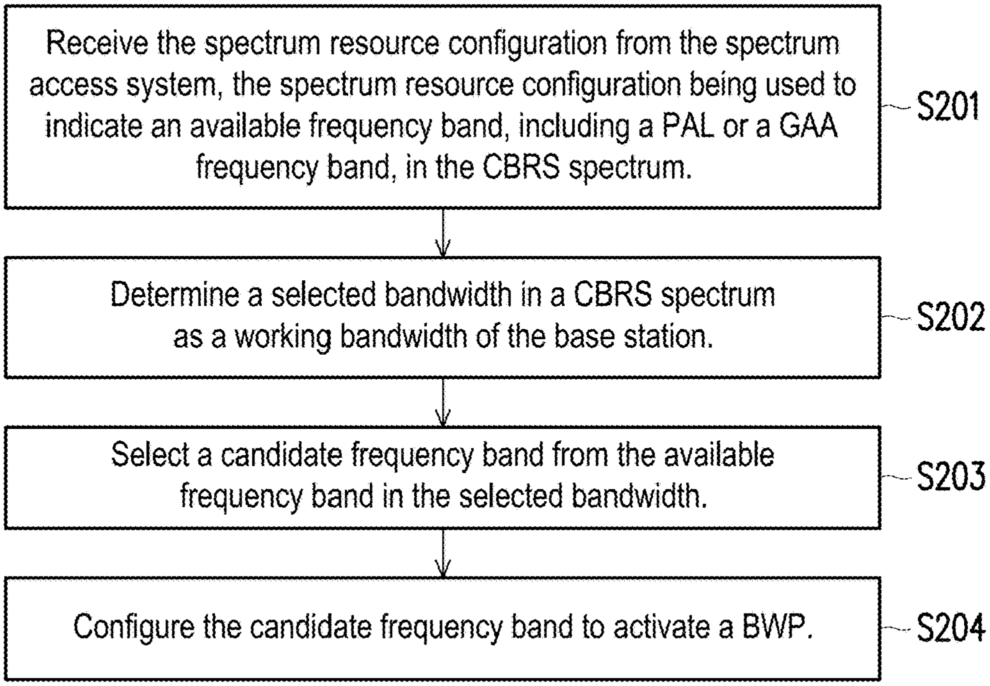
FIG. 2 shows a flow chart of a bandwidth selection method for a citizens broadband radio service according to an embodiment of the disclosure.

FIG. 2 shows a flow chart of a bandwidth selection method for a citizens broadband radio service (CBRS) according to an embodiment of the disclosure. Each step in FIG. 2 may be implemented by a base station. The base station may be nodes B, eNB, and gNB. In some embodiments, the base station may further include a central unit (CU), a distributed unit (DU), or the like, and the disclosure is not limited thereto.

Figure 1:
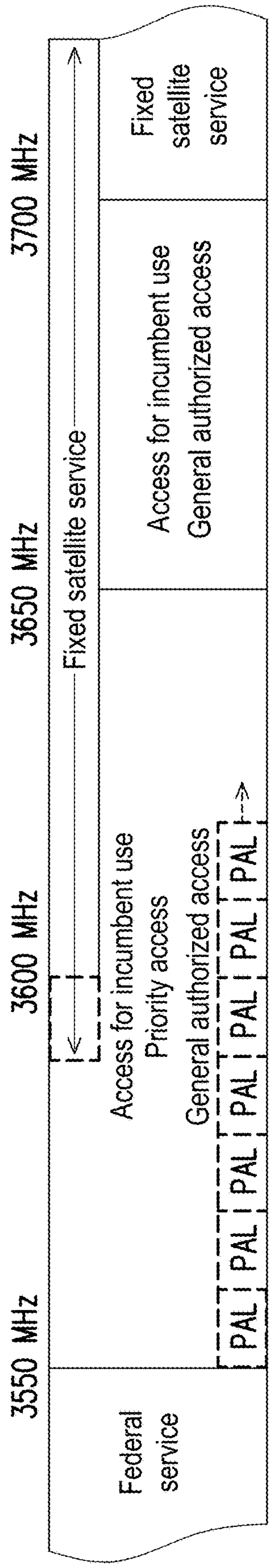
FIG. 1 shows a schematic diagram of a spectrum resource of a citizens bandwidth radio service.

In Step S201, the base station receives a spectrum resource configuration from a spectrum access system. The spectrum resource configuration indicates at least one available frequency band, and the at least one available frequency band includes a priority access licensed (PAL) frequency band or a general authorized access (GAA) frequency band. Next, in Step S202, the base station determines a selected bandwidth in a CBRS spectrum as a working bandwidth of the base station, wherein the selected bandwidth includes a part or all of the available frequency band. Then, in Step S203, the base station selects a candidate frequency band from the available frequency band in the selected bandwidth. Furthermore, in Step S204, the candidate frequency band is configured by the base station to activate a bandwidth part. Specifically, in Step S201, the base station may receive the spectrum resource configuration from the spectrum access system (SAS). The spectrum resource configuration may be used to indicate one or more available frequency bands in the CBRS spectrum (i.e., between 3550 MHz and 3700 MHz as shown in FIG. 1). In the disclosure, a frequency band [x, y] (or a bandwidth [x, y]) may be used to represent an available frequency band indicated by the spectrum resource configuration, where x is a starting frequency of the frequency band (unit: MHz) and y is an ending frequency of the frequency band (unit: MHz). The spectrum resource configuration may also indicate whether each available frequency band is a PAL frequency band or a GAA frequency band.

Generally, a system operator (e.g., an owner of a base station) may obtain a PAL frequency band of a fixed width (e.g., 40 MHz) from an administrator of the SAS by pre-registration/lease. When the base station transmits a request to the SAS, the spectrum resource configuration returned by the SAS indicates the starting frequency and the ending frequency of the PAL frequency band of 40 MHz. On the other hand, since the use of the CBRS spectrum is prioritized, the GAA frequency band in the spectrum resource configuration returned by the SAS is a frequency band which is still unoccupied in the CBRS spectrum and can be allocated to the base station for application when the base station transmits a request to the SAS. For example, the GAA frequency band may be, at the moment when the SAS receives a request, a part or all of a frequency band that is unoccupied by either the frequency band for incumbent use or the PAL frequency band in the CBRS spectrum. According to the actual usage conditions, the available frequency band indicated by the spectrum resource configuration may be one or more contiguous or non-contiguous frequency bands. In some actual cases, even though the operator of the base station has obtained a frequency band of 40 MHz by pre-registration, the available frequency band assigned by the SAS may still be multiple non-contiguous available frequency bands with a sum of 40 MHz. In some actual cases, the available frequency band in the CBRS spectrum indicated by the spectrum resource configuration changes with time. The base station must obtain the spectrum resource configuration from the SAS periodically to acquire information of the corresponding available frequency band. That is, the PAL frequency band of 40 MHz obtained through pre-registration may be multiple non-contiguous available frequency bands in the CBRS spectrum. The PAL frequency band of 40 MHz may also change with time.

Table 1 shows examples of the available frequency bands indicated by the spectrum resource configuration. For example, the spectrum resource configuration received from the SAS by the base station may be one of spectrum resource configurations #1 to #6 in Table 1. Taking the spectrum resource configuration #4 in Table 1 for example, the spectrum resource configuration #4 may, e.g., indicate that the available frequency bands includes a frequency band [3550, 3650] (i.e., a frequency band between 3550 MHz and 3650 MHz) and a frequency band [3660, 3700] (i.e., a frequency band between 3660 MHz and 3700 MHz). In some embodiments, the spectral resource configuration #4 may further indicate that the available frequency band [3550, 3650] is a PAL frequency band and the available frequency band [3660, 3700] is a GAA frequency band.

TABLE 1

| Index of Spectrum Resource Configuration | One or More Available Frequency Bands Provided by SAS |
|---|---|
| #1 | [0, 0] |
| #2 | [3550, 3700] |
| #3 | [3560, 3700] |
| #4 | [3550, 3650], [3660, 3700] |
| #5 | [3550, 3560], [3570, 3590], [3600, 3650] |
| #6 | [3550, 3560], [3570, 3600], [3600, 3670] |
| #7 | [3550, 3560], [3580, 3600], [3600, 3650], [3660, 3700] |
| . . . | . . . |

Generally, the base station may set a transmission frequency of an uplink signal and/or a downlink signal within a frequency range of a working bandwidth to communicate with user equipment within a signal coverage range of the base station. In Step S202, the base station may determine the selected bandwidth from the CBRS spectrum as the working bandwidth of the base station. In some practical applications, a preset width of a cell bandwidth of the base station is 100 MHz, and the working bandwidth may be matched with the width of the cell bandwidth. The contiguous frequency band of 100 MHz in the CBRS spectrum is set as the working bandwidth. In some embodiments, the base station may further set one or more bandwidth parts (BWP) through division in the working bandwidth, which enables the base station to communicate with user equipment in a more flexible, resource-saving and bandwidth-saving manner.

Briefly, BWP is a technology in 5G systems. Generally, a BWP may divide a large bandwidth into multiple bandwidths having smaller time divisions. Each of the smaller bandwidths may have different parameter configurations to adapt to different types of ends (e.g., user equipment served by the base station) and business requirements. The BWP has the advantages of reducing the power consumption of an end, improving the spectrum utilization rate, and supporting slicing of various scenes. In general, the BWP is an important feature of the elasticized and extensible design in 5G systems.

Next, the selected bandwidth may include a part or all of the available frequency band indicated by the spectrum resource configuration. In most cases, the selected bandwidth covers as many of the available frequency bands indicated by the spectrum resource configuration. For example, under the condition of the spectrum resource configuration received by the base station being the spectrum resource configuration #5 in Table 1, if a selected bandwidth is set to [3550, 3650], the selected bandwidth [3550, 3650] covers all available frequency bands indicated by the spectrum resource configuration #5 (i.e., available frequency bands [3550, 3560], [3570, 3590], and [3600, 3650]). Assuming that the selected bandwidth is [3560, 3660], the selected bandwidth [3560, 3660] only includes a part of the available frequency bands indicated by the spectrum resource configuration #5 (i.e., available frequency bands [3570, 3590] and [3600, 3650]. That is, in a working bandwidth of 100 MHz such as the bandwidth [3550, 3650], a total of three non-contiguous available frequency bands of 10 MHz, 20 MHz, and 50 MHz may be applied. However, in a working bandwidth of 100 MHz such as the bandwidth [3560,3660], only two non-contiguous available frequency bands of 20 MHz and 50 MHz are may be applied.

To maximize the available frequency band covered in the selected bandwidth, in some embodiments, the base station may use a sliding window having the same width as the cell bandwidth (e.g., 100 MHz) to obtain multiple contiguous bandwidths from the CBRS spectrum, and then select one of the obtained contiguous bandwidths as the selected bandwidth, as will be described in detail with accompanying drawings.

Figure 3:
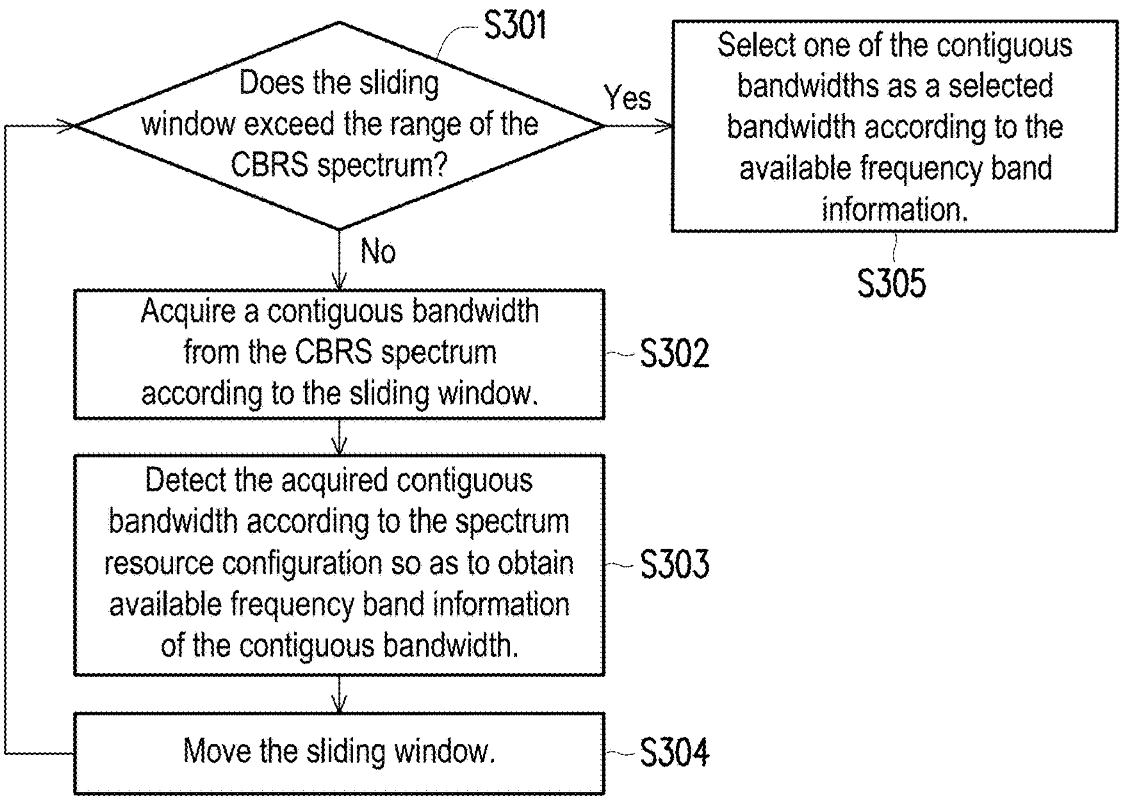
FIG. 3 shows a flow chart of a detailed implementation of Step 202 according to an embodiment of the disclosure.

FIG. 3 shows a flow chart of a detailed implementation of Step S202 according to an embodiment of the disclosure. In step S301, the base station may determine whether the sliding window exceeds the range of the CBRS spectrum (i.e., 3550 MHz to 3700 MHz). If the sliding window exceeds the range of the CBRS spectrum, the process proceeds to Step S305. If the sliding window does not exceed the range of the CBRS spectrum, the process proceeds to Step S302.

Specifically, the base station may store a pre-configured sliding window. The sliding window may be represented as [i, j], where i is a starting frequency of the sliding window (unit: MHz), and j is an ending frequency of the sliding window (unit: MHz). An initial starting frequency, an initial ending frequency, a window size, or a step length (i.e., a frequency width per movement of the sliding window) of the sliding window may be pre-configured in the base station. For example, the window size of the sliding window may be pre-configured to 100 MHz, and the step length may be pre-configured to 5 MHz. In some embodiments, if the starting frequency of the sliding window exceeds the range of the CBRS spectrum (i.e., the starting frequency is less than or equal to 3550 MHz, or greater than or equal to 3700 MHz), the base station may determine that the sliding window exceeds the range of the CBRS spectrum. If the starting frequency of the sliding window does not exceed the range of the CBRS spectrum (i.e., the starting frequency is greater than 3550 MHz and less than 3700 MHz), the base station may determine that the sliding window does not exceed the range of the CBRS spectrum. In some embodiments, if the ending frequency of the sliding window exceeds the range of the CBRS spectrum (i.e., the ending frequency is less than or equal to 3550 MHz, or greater than or equal to 3700 MHz), the base station may determine that the sliding window exceeds the range of the CBRS spectrum. If the ending frequency of the sliding window does not exceed the range of the CBRS spectrum (i.e., the ending frequency is greater than 3550 MHz and less than 3700 MHz), the base station may determine that the sliding window does not exceed the range of the CBRS spectrum.

In step S302, the base station may acquire a contiguous bandwidth from the CBRS spectrum according to the sliding window. For example, at a first time point when the starting frequency and the ending frequency of the sliding window are both [3550, 3650], the base station may acquire a contiguous bandwidth (e.g., a first contiguous bandwidth), a starting frequency and an ending frequency of which being [3550, 3650]. Further, at a second time point when the sliding window moves to a position where the starting frequency and the ending frequency are [3555, 3655], the base station may acquire a contiguous bandwidth (e.g., a second contiguous bandwidth), a starting frequency and an ending frequency of which being [3555, 3655].

Next, in Step S303, the base station may detect the acquired contiguous bandwidth according to the spectrum resource configuration so as to obtain available frequency band information of the contiguous bandwidth and record the available frequency band information. The available frequency band information is used to indicate the available frequency band in the contiguous bandwidth. Specifically, the base station may read a starting frequency and an ending frequency of the contiguous bandwidth as well as obtaining, from the spectrum resource configuration, a starting frequency and an ending frequency of an available frequency band indicated by the spectrum resource configuration. The available frequency band in the contiguous bandwidth indicated by the available frequency band information may include an available frequency band partially overlapping the contiguous bandwidth or an available frequency band entirely in the contiguous bandwidth. In some embodiments, the base station determines whether the available frequency band is located in the contiguous bandwidth according to the starting frequency of the available frequency band. That is, once the base station determines that a starting frequency of an available frequency band is located between the starting frequency and the ending frequency of the contiguous bandwidth, the base station records the available frequency band in the available frequency band information of the contiguous bandwidth.

Taking the spectrum resource configuration #6 in Table 1 for example, an assumption is made that the contiguous bandwidth acquired by the sliding window is [3550, 3650]. The spectrum resource configuration #6 includes three available frequency bands [3550, 3560], [3570, 3600], and [3600, 3670]. According to the starting frequencies of the three available frequency bands (i.e., 3550 MHz, 3570 MHz, and 3600 MHz), the base station may determine that all of the three available frequency bands are located in the contiguous bandwidth [3550, 3650]. Therefore, the base station records all of the three available frequency bands in the available frequency band information corresponding to the contiguous bandwidth [3550, 3650]. This way, the available frequency band information of the contiguous bandwidth [3550, 3650] may indicate that the available frequency bands in the contiguous bandwidth [3550, 3650] include the available frequency band [3550, 3560], the available frequency band [3570, 3600], and the available frequency band [3600, 3670]. It is noted that the frequency band [3550, 3560] and the frequency band [3570, 3600] are entirely located in the contiguous bandwidth [3550, 3650], and the frequency band [3600, 3670] partially overlaps the contiguous bandwidth [3550, 3650].

In Step S304, the base station may move the sliding window according to the step length of the sliding window. An assumption is made that the window size of the sliding window is 100 MHz with the step length being 5 MHz. As described above, an initial position of the sliding window is [3550, 3650], and the base station may move the sliding window from [3550, 3650] to the position [3555, 3655] according to the step length of 5 MHz. After Step S304 is performed, the base station re-performs Step S301, thereby acquiring a contiguous bandwidths with a starting frequency of [3555, 3655] and a contiguous bandwidths with an ending frequency of [3555, 3655] and recording the corresponding available frequency band information (Steps S302 and S303). Thus, before the sliding window exceeds the range of the CBRS spectrum, the base station may perform Steps S301 to S304 repeatedly to acquire multiple contiguous bandwidths and further obtain multiple available frequency band information corresponding to the respective contiguous bandwidths.

It should be noted that the disclosure does not intend to limit a moving direction of the sliding window. In the above embodiments, the sliding window is moved from a low frequency position to a high frequency position, but in some embodiments, the sliding window may be set to be moved from the high frequency position to the low frequency position. In an embodiment where the sliding window is moved from the high frequency position to the low frequency position, the base station may instead determine whether an available frequency band is in the contiguous bandwidth according to an ending frequency of the available frequency band.

When the base station determines that the sliding window has exceeded the range of the CBRS spectrum ("Yes" in Step S301), the base station may further perform Step S305. At this time, the base station has obtained multiple contiguous bandwidths in the range of the CBRS spectrum along with the available frequency band information corresponding to the respective contiguous bandwidths through the sliding window. In Step S305, the base station may select one of the contiguous bandwidths as a selected bandwidth according to the available frequency band information. The base station may obtain an available frequency band in the selected bandwidth according the available frequency band information corresponding to the selected bandwidth.

In some practical cases, the available frequency bands included in the spectrum resource configuration received from the SAS may actually be contiguous frequency bands that may be connected end to end. In addition, a part of the available frequency band obtained through the steps in FIG. 3 and recorded in the available frequency band information corresponding to the contiguous bandwidth may exceed the contiguous bandwidth. Therefore, to solve these problems, in some embodiments, the base station may update the available frequency band information of each contiguous bandwidth before selecting a selected bandwidth from contiguous bandwidths. This facilitates the base station to select the best bandwidth of contiguous bandwidths as the selected bandwidth.

Figure 4:
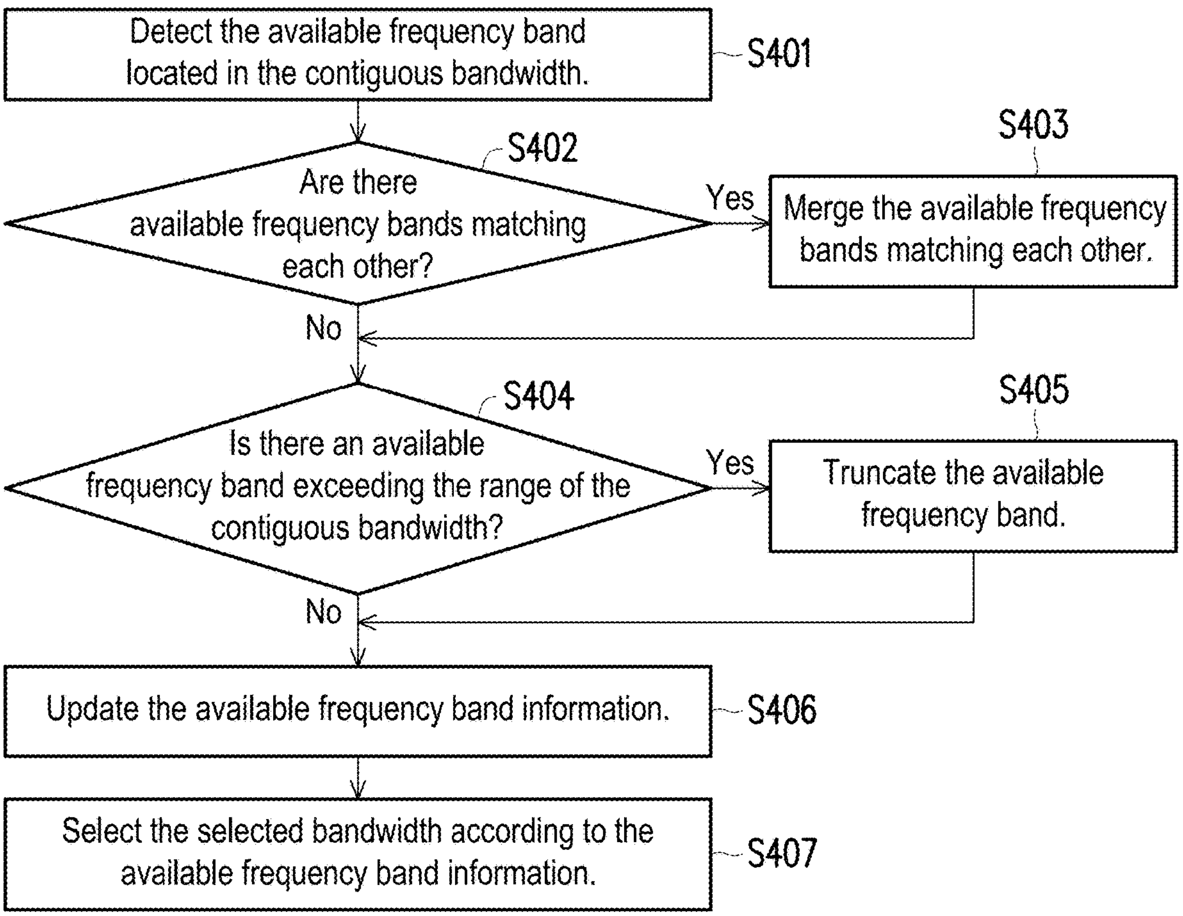
FIG. 4 shows a flow chart of a method of updating an available frequency band information according to an embodiment of the disclosure.

FIG. 4 shows a flow chart of a method of updating an available frequency band information according to an embodiment of the disclosure. The step-by-step process described in FIG. 4 may be used to implement a part of Step S305 in FIG. 3. In Step S401, the base station may detect one or more available frequency bands located in the contiguous bandwidth according to the available frequency band information of the contiguous bandwidth. In some embodiments, the information related to the available frequency band in the contiguous bandwidth is already recorded in the available frequency band information corresponding to the contiguous bandwidth (e.g., the information is obtained and recorded through Step S303). Therefore, the base station only has to read the available frequency band from the available frequency band information. In some embodiments, the base station may determine whether the available frequency band is located in the contiguous bandwidth according to the starting frequency of the available frequency band, a starting frequency of the contiguous bandwidth, and an ending frequency of the contiguous bandwidth. If the starting frequency of the available frequency band is greater than or equal to the starting frequency of the contiguous bandwidth and less than or equal to the ending frequency of the contiguous bandwidth, the base station determines that the available frequency band is located in the contiguous bandwidth. If the starting frequency of the available frequency band is less than the starting frequency of the contiguous bandwidth or greater than the ending frequency of the contiguous bandwidth, the base station determines that the available frequency band is located outside the contiguous bandwidth. Taking the available frequency band [3550, 3560] indicated by the spectrum resource configuration #6 in Table 1 for example, an assumption is made that the base station aims to determine whether the frequency band [3550, 3560] is located in the contiguous bandwidth [3550, 3650]. Since a starting frequency (3550 MHz) of the frequency band [3550, 3560] is greater than or equal to a starting frequency (3550 MHz) of the contiguous bandwidth [3550, 3650] and less than or equal to an ending frequency (3650 MHz) of the contiguous bandwidth [3550, 3650], the base station may determine that the frequency band [3550, 3560] is located in the contiguous bandwidth [3550, 3650].

In an embodiment, the base station may determine whether the available frequency band is located in the contiguous bandwidth according to the ending frequency of the available frequency band, a starting frequency of the contiguous bandwidth, and an ending frequency of the contiguous bandwidth. If the ending frequency of the available frequency band is greater than or equal to the starting frequency of the contiguous bandwidth and less than or equal to the ending frequency of the contiguous bandwidth, the base station determines that the available frequency band is located in the contiguous bandwidth. If the ending frequency of the available frequency band is less than the starting frequency of the contiguous bandwidth or greater than the ending frequency of the contiguous bandwidth, the base station determines that the available frequency band is located outside the contiguous bandwidth. Taking the available frequency band [3550, 3560] indicated by the spectrum resource configuration #6 in Table 1 for example, an assumption is made that the base station aims to determine whether the frequency band [3550, 3560] is located in the contiguous bandwidth [3550, 3650]. Since the ending frequency (3560 MHz) of the frequency band [3550, 3560] is greater than or equal to the starting frequency (3550 MHz) of the contiguous bandwidth [3550, 3650] and less than or equal to the ending frequency (3650 MHz) of the contiguous bandwidth [3550, 3650], the base station may determine that the frequency band [3550, 3560] is located in the contiguous bandwidth [3550, 3650].

In Step S402, the base station may determine whether there are available frequency bands matching each other in the contiguous bandwidth. More specifically, the base station may determine whether there are a first available frequency band and a second available frequency band in the contiguous bandwidth, wherein an ending frequency of the first available frequency band and a starting frequency of the second available frequency band match each other (e.g., the ending frequency of the first available frequency band and the starting frequency of the second available frequency band are the same). If the base station determines that there are available frequency bands matching each other in the contiguous bandwidth, the process proceeds to Step S403. If the base station determines that there are no available frequency bands matching each other in the contiguous bandwidth, the process proceeds to Step S404.

For example, an assumption is made that the spectrum resource configuration received from the SAS is the spectrum resource configuration #6. The frequency of the contiguous bandwidth is [3550, 3650], and there are an available frequency band [3550, 3560], an available frequency band [3570, 3600], and an available frequency band [3600, 3670] in the contiguous bandwidth [3550, 3650]. Since an ending frequency (3600 MHz) of the available frequency band [3570, 3600] matches a starting frequency of the available frequency band [3600, 3670], the base station may determine that there are available frequency bands matching each other in the contiguous bandwidth [3550, 3650]. For another example, an assumption is made that the spectrum resource configuration received from the SAS is the spectrum resource configuration #5, and the frequency of the contiguous bandwidth is also [3550, 3650]. The available frequency band [3550, 3560], the available frequency band [3570, 3590], and the available frequency band [3600, 3650] are included in the contiguous bandwidth [3550, 3650]. Since an ending frequency (3560 MHz) of the available frequency band [3550, 3560] does not match a starting frequency (3570 MHz) of the available frequency band [3570, 3590], and an ending frequency (3590 MHz) of the available frequency band [3570, 3590] does not match a starting frequency (3600 MHz) of the available frequency band [3600, 3650], the base station may determine that there are no available frequency bands matching each other in the contiguous bandwidth [3550, 3650].

When there are available frequency bands matching each other in the contiguous bandwidth, that is, when the available frequency bands matching each other may be connected to each other, the available frequency bands can in fact be regarded as a contiguous available frequency band. In Step S403, the base station combines the available frequency bands matching each other into a new available frequency band. For example, an assumption is made that the spectrum resource configuration received from the SAS by the base station is the spectrum resource configuration #6 in Table 1, and a current contiguous bandwidth is set to [3550, 3650]. Based on a starting frequency and an ending frequency of each available frequency band indicated by the spectrum resource configuration #6, the base station may determine that there are available frequency bands matching each other, which are the available frequency band [3570, 3600] and the available frequency band [3600, 3670], in the contiguous bandwidth [3550, 3650]. The base station may combine the available frequency band [3570, 3600] and the available frequency band [3600, 3670] into a new available frequency band [3570, 3670].

In Step S404, the base station determines whether there is an available frequency band in the contiguous bandwidth exceeding the range of the contiguous bandwidth. If the base station determines that there is an available frequency band in the contiguous bandwidth exceeding the range of the contiguous bandwidth, the process proceeds to Step S405. If the base station determines that there is no available frequency band exceeding the range of the contiguous bandwidth, the process proceeds to Step S406.

In some embodiments, in previous steps (e.g. Step S303 or Step S401), the base station has determined whether the available frequency band is located in the contiguous bandwidth according to the starting frequency of the available frequency band. Here, the base station may determine whether each available frequency band exceeds the range of the contiguous bandwidth in response to whether an ending frequency of each available frequency band located in the contiguous bandwidth is greater than the ending frequency of the contiguous bandwidth. In some embodiments, in previous steps (e.g. Step S303 or Step S401), the base station has determined whether the available frequency band is located in the contiguous bandwidth according to the ending frequency of the available frequency band. Here, the base station may determine whether each available frequency band exceeds the range of the contiguous bandwidth in response to whether the starting frequency of each available frequency band located in the contiguous bandwidth is less than the starting frequency of the contiguous bandwidth.

For example, an assumption is made that the spectrum resource configuration received from the SAS by the base station is the spectrum resource configuration #6 in Table 1. A current sliding window is moved to a frequency interval of [3550, 3650], and the contiguous bandwidth is set to [3550, 3650]. Through the starting frequency and the ending frequency of the contiguous bandwidth [3550, 3650] and the starting frequency of each available frequency band in the spectrum resource configuration #6, the base station determines that the contiguous bandwidth [3550, 3650] covers the available frequency bands [3550, 3560], [3570, 3600], and [3600, 3670]. The base station may determine that the available frequency band [3600, 3670] exceeds the range of the contiguous bandwidth [3550, 3650] in response to an ending frequency of the available frequency band [3600, 3670] being greater than the ending frequency (3650 MHz) of the contiguous bandwidth [3550, 3650].

In Step S405, the base station may truncate the available frequency band exceeding the contiguous bandwidth. Specifically, if the ending frequency of the available frequency band is greater than the ending frequency of the contiguous bandwidth, the base station may update the ending frequency of the available frequency band to the ending frequency of the contiguous bandwidth. On the other hand, if the starting frequency of the available frequency band is less than the starting frequency of the contiguous bandwidth, the base station may update the starting frequency of the available frequency band to the starting frequency of the contiguous bandwidth.

Continuing the above example, the base station determines that the available frequency band [3600, 3670] exceeds the range of the contiguous bandwidth [3550, 3650] in response to the ending frequency of the available frequency band [3600, 3670] being greater than the ending frequency (3650 MHz) of the contiguous bandwidth [3550, 3650]. Specifically, when the ending frequency (3670 MHz) of the available frequency band [3600, 3670] is greater than the ending frequency (3650 MHz) of the contiguous bandwidth [3550, 3650], and the base station updates the ending frequency (3670 MHz) of the available frequency band [3600, 3670] to the ending frequency (3650 MHz) of the contiguous bandwidth [3550, 3650], thereby obtaining the updated available frequency band [3600, 3650].

In Step S406, the base station may record a starting frequency and an ending frequency of the new available frequency band (e.g., through merging) or the updated available frequency band (e.g., through updating after truncation) in the available frequency band information of the contiguous bandwidth so as to update the available frequency band information. Continuing the above example of the base station determining that the contiguous bandwidth [3550, 3650] covers the available frequency bands [3550, 3560], [3570, 3600], and [3600, 3670] through the starting frequency and the ending frequency of the contiguous bandwidth [3550, 3650] and the starting frequency of each available frequency band in the spectrum resource configuration #6, the base station determines that the available frequency bands [3570, 3600] and [3600, 3670] match each other and may be combined into the new available frequency band [3570, 3670] through Steps S402 and S403. Then, through Steps S404 and S405, the base station determines that the available frequency band [3570, 3670] has a frequency range exceeding the contiguous bandwidth and requires truncation. Hence, the base station further updates the new available frequency band [3570, 3670] to [3570, 3650]. As a result, in Step S406, the base station may update the available frequency band information so as to include the available frequency bands [3550, 3560] and [3570, 3650].

In some embodiments, the base station may further divide the available frequency band in the contiguous bandwidth according to a default length, thereby updating the available frequency band information of the contiguous bandwidth. Specifically, the default length may include 10 MHz, 20 MHz, 30 MHz, or 40 MHz. In some embodiments, the default lengths are related to a setting of the bandwidth part. For example, based on a system setting, the base station can only activate a bandwidth part within a bandwidth size in the default lengths, but the disclosure is not limited thereto. The default length may vary with the system setting. In some embodiments, the base station may determine whether the available frequency band in the contiguous bandwidth match the default length. If the available frequency band does not match any of the default lengths, the base station may divide the available frequency band into multiple available frequency bands according to a longest default length which is shorter than the available frequency band, and record the starting frequencies and the ending frequencies of the available frequency bands in the available frequency band information corresponding to the contiguous bandwidth so as to update the available frequency band information.

For example, an assumption is made that there is an available frequency band [3550, 3650] in the contiguous bandwidth [3550, 3650]. Since a width (100 MHz) of the available frequency band [3550, 3650] does not match the default lengths of 10 MHz, 20 MHz, 30 MHz, and 40 MHz, the base station divides the available frequency band [3550, 3650] into multiple available frequency bands according to a default length shorter than the available frequency band [3550, 3650]. For example, the base station may divide the available frequency band [3550, 3650] into an available frequency band [3550, 3590] having a width of 40 MHz and an available frequency band [3590, 3650] having a width of 60 MHz according to the default length of 40 MHz. Next, the base station further divides the available frequency band [3590, 3650] having a width of 60 MHz into an available frequency band [3590, 3630] having a width of 40 MHz and an available frequency band [3630, 3650] having a width of 20 MHz according to the default length of 40 MHz. The available frequency band [3630, 3650] having a width of 20 MHz consists with the default length of 20 MHz. Therefore, no further division is required. Therefore, the original available frequency band [3550, 3650] may be divided into three available frequency bands, which are the available frequency band [3550, 3590] having a width of 40 MHz, the available frequency band [3590, 3630] having a width of 40 MHz, and the available frequency band [3630, 3650] having a width of 20 MHz.

In another example, an assumption is made that there is an available frequency band [3600, 3650] in the contiguous bandwidth [3550, 3650]. Since a width (50 MHz) of the available frequency band [3600, 3650] does not match the default lengths of 10 MHz, 20 MHz, 30 MHz, and 40 MHz, the base station divides the available frequency band [3600, 3650] into multiple available frequency bands according to a default length shorter than the available frequency band [3600, 3650]. For example, the base station may divide the available frequency band [3600, 3650] into an available frequency band [3600, 3640] having a width of 40 MHz and an available frequency band [3640, 3650] having a width of 10 MHz according to the default length of 40 MHz. The available frequency band [3600, 3640] having a width of 40 MHz consists with the default length of 40 MHz, and the available frequency band [3640, 3650] having a width of 10 MHz consists with the default length of 10 MHz. Therefore, no further division is required. Therefore, the original available frequency band [3600, 3650] may be divided into two available frequency bands, which are the available frequency band [3600, 3640] having a width of 40 MHz and the available frequency band [3640, 3650] having a width of 10 MHz.

In some embodiments, the base station may selectively store a fixed number (e.g., four groups) of available frequency bands with higher priority in the available frequency band information of the contiguous bandwidth in order to save data space, improve computing efficiency, and reduce energy consumption. Here, the priority may include a type of a frequency band (for example, the PAL frequency band takes precedence over the GAA frequency band) or a size of a frequency band (for example, the storage of an available frequency band of 40 MHz is prioritized), and the disclosure is not limited thereto.

In Step S407, the base station may select one of the contiguous bandwidths as a selected bandwidth according to the available frequency band information of each contiguous bandwidth. In some embodiments, the base station may determine which of the contiguous bandwidths serves as the selected bandwidth according to the priority of each contiguous bandwidth. For example, the base station selects a contiguous bandwidth having the highest priority among the contiguous bandwidths as the selected bandwidth. In some embodiments, the priority of each contiguous bandwidth is related to the priority of the available frequency bands included in each contiguous bandwidth. For example, the available frequency band (e.g., the PAL frequency band or a wider available frequency band) having a higher priority or multiple available frequency bands having a higher priority in the contiguous bandwidth may result in a higher priority for the contiguous bandwidth. The base station may prioritize these contiguous bandwidths according to a comprehensive consideration of factors, including a variety of conditions and weights (e.g., the degree of prioritization due to the PAL frequency band or the level of priority of the wider available frequency band). The base station may then select the selected bandwidth according to the prioritization result of the contiguous bandwidths. For example, the base station selects the contiguous bandwidth having the highest priority (i.e., the first place in prioritization) as the selected bandwidth.

Figure 5:
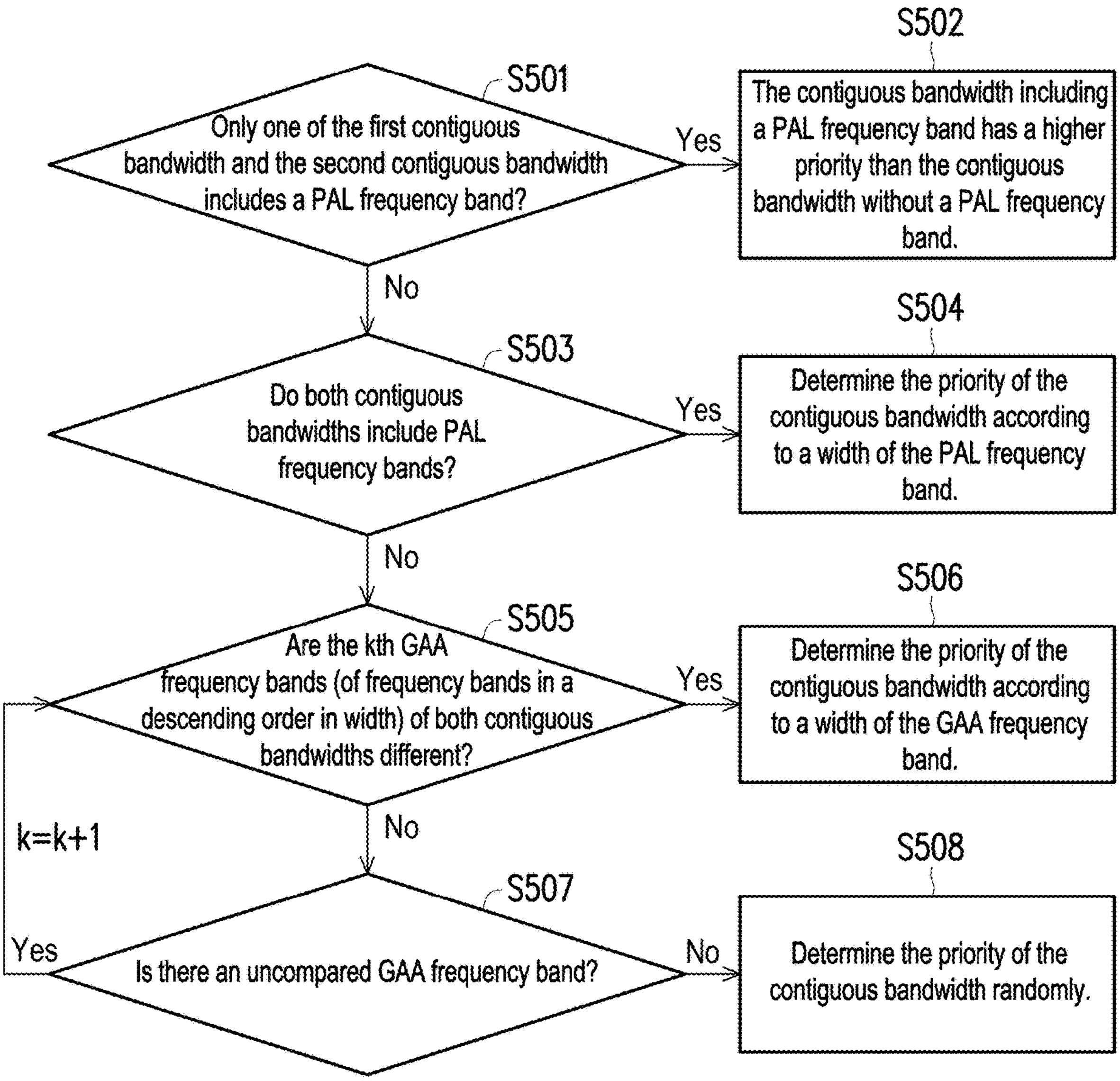
FIG. 5 shows a flow chart of a method of comparing a first contiguous bandwidth and a second contiguous bandwidth for priority according to an embodiment of the disclosure.

FIG. 5 shows a flow chart of a method of comparing a first contiguous bandwidth and a second contiguous bandwidth for priority according to an embodiment of the disclosure. In order to make the description more concise, the first contiguous bandwidth and the second contiguous bandwidth in FIG. 5 may be a part or all of the aforementioned contiguous bandwidths. In case of the number of the contiguous bandwidths being greater than two, it is possible to prioritize the contiguous bandwidths with the same or a similar method as described in FIG. 5.

In addition, in some embodiments, the steps shown in FIG. 5 may be a part of Step S407. Referring to FIG. 5, in Step S501, the base station determines whether only the available frequency band in one of the first contiguous bandwidth and the second contiguous bandwidth includes a PAL frequency band. If only the available frequency band in the first contiguous bandwidth or the second contiguous bandwidth includes a PAL frequency band, the process proceeds to Step S502. In Step S502, since only the available frequency band in one of the contiguous bandwidths (e.g., the available frequency band of the first contiguous bandwidth) includes a PAL frequency band, the first contiguous bandwidth may be prior to the second contiguous bandwidth as the second contiguous bandwidth does not have an available PAL frequency band. Thus, the base station may determine that the first contiguous bandwidth, which includes an available PAL frequency band, has a higher priority than the second contiguous bandwidth. That is, if the first contiguous bandwidth and the second contiguous bandwidth are available for selection by the base station, the base station may select the first contiguous bandwidth among the first contiguous bandwidth and the second contiguous bandwidth as the selected bandwidth.

Next, if only the available frequency band in one of the first contiguous bandwidth and the second contiguous bandwidth including a PAL frequency band is not the case, i.e., both the available frequency band in the first contiguous bandwidth and the available frequency band in the second contiguous bandwidth include PAL frequency bands, or neither the available frequency band in the first contiguous bandwidth nor the available frequency band in the second contiguous bandwidth includes a PAL frequency band, the process proceeds to Step S503. In Step S503, the base station determines whether both the available frequency band in the first contiguous bandwidth and the available frequency band in the second contiguous bandwidth include PAL frequency bands. If both the available frequency band in the first contiguous bandwidth and the available frequency band in the second contiguous bandwidth include PAL frequency bands, the process proceeds to Step S504. If neither the available frequency band in the first contiguous bandwidth nor the available frequency band in the second contiguous bandwidth includes a PAL frequency band, the process proceeds to Step S505.

If both the available frequency band in the first contiguous bandwidth and the available frequency band in the second contiguous bandwidth include PAL frequency bands, the base station determines the priority of each contiguous bandwidth according to a width of each PAL frequency band in Step S504. Specifically, assuming that the width of the PAL frequency band in the first contiguous bandwidth is greater than the width of the PAL frequency band in the second contiguous bandwidth, the base station may determine that the first contiguous bandwidth is prior to the second contiguous bandwidth in response to the width of the PAL frequency band in the first contiguous bandwidth being greater than the width of the PAL frequency band in the second contiguous bandwidth. For example, an assumption is made that the available frequency band in the first contiguous bandwidth includes a PAL frequency band [3570, 3590] and the available frequency band in the second contiguous bandwidth includes a PAL frequency band [3550, 3560]. The base station may determine that the first contiguous bandwidth is prior to the second contiguous bandwidth in response to a width (20 MHz) of the PAL frequency band [3570, 3590] in the first contiguous bandwidth being greater than a width (10 MHz) of the PAL frequency band [3550, 3560] in the second contiguous bandwidth.

In some embodiments, the available frequency bands in the available frequency band information of the first contiguous bandwidth and of the second contiguous bandwidth are presented in a descending order according to the widths of the available frequency bands. If neither the available frequency band in the first contiguous bandwidth nor the available frequency band in the second contiguous bandwidth includes a PAL frequency band ("Yes" in Step S505), in Step S505, the base station detects a width of a kth GAA frequency band (of frequency bands in a descending order in width) in the available frequency band in the first contiguous bandwidth as well as a width of a kth GAA frequency band in the available frequency band in the second contiguous bandwidth, where k is a positive integer with an initial value of zero. The base station may compare the widths of the two GAA frequency bands and determine whether the widths of the two GAA frequency bands are different. If the base station determines that the widths of the two GAA frequency bands are different, the process proceeds to Step S506. If the base station determines that the widths of the two GAA frequency bands are the same, the process proceeds to Step S507.

In Step S506, the base station determines the priority of the contiguous bandwidth according to the width of the GAA frequency band. Specifically, the initial value of k may be set to 1, and the base station may determine that the first contiguous bandwidth is prior to the second contiguous bandwidth in response to the width of the kth GAA frequency band in the first contiguous bandwidth being greater than the width of the kth GAA frequency band in the second contiguous bandwidth. For example, an assumption is made that the widest GAA frequency band (i.e., the 1st GAA frequency band) in the available frequency band in the first contiguous bandwidth is [3660, 3700], and the widest GAA frequency band in the available frequency band in the second contiguous bandwidth is [3550, 3560]. The base station may determine that the first contiguous bandwidth is prior to the second contiguous bandwidth in response to a width (40 MHz) of the GAA frequency band [3660, 3700] in the first contiguous bandwidth being greater than a width (10 MHz) of the GAA frequency band [3550, 3560] in the second contiguous bandwidth.

In Step S507, the base station determines whether both the available frequency band in the first contiguous bandwidth and the available frequency band in the second contiguous bandwidth include GAA frequency bands that have not been compared in width. If the available frequency band in the first contiguous bandwidth includes a GAA frequency band that has not been compared in width, and the available frequency band in the second contiguous bandwidth includes a GAA frequency band that has not been compared in width, the base station may increment the value of the positive integer k by one and re-performs Step S505. If the available frequency band in the first contiguous bandwidth does not include a GAA frequency band that has not been compared in width, and/or the available frequency band in the second contiguous bandwidth does not include a GAA frequency band that has not been compared in width, the process proceeds to Step S508.

In Step S508, the base station randomly determines which of the first contiguous bandwidth and the second contiguous bandwidth has a higher priority. In short, Steps S505 to S508 are a series of comparison of the widths of all of the available frequency bands in the first contiguous bandwidth and the second contiguous bandwidth. That is, the contiguous bandwidth including the wider available frequency band has a higher priority. If a width of the widest available frequency band in the first contiguous bandwidth is equal to a width of the widest available frequency band in the second contiguous bandwidth, the widths of the second widest available frequency bands are compared. The rest may be inferred by analogy. If all of the available frequency bands are compared but it still cannot be determined which available frequency band is wider, as the two factors, a type of a frequency band and a width of a frequency, serve as the comparison basis, the first contiguous bandwidth and the second contiguous bandwidth have substantially the same priority in Step S508. However, to facilitate simple steps provided later, the base station may randomly determine that one of the available frequency bands has a higher priority.

It is worth mentioning that the steps shown in FIG. 5 are exemplary. The order of the steps may be altered, and changes may be made according to the actual situation. For example, in some embodiments, the base station may perform the determination of Step S303 before performing the determination of Step S301. In some embodiments, the first contiguous bandwidth and the second contiguous bandwidth each includes more than one available frequency band being a PAL frequency band. In these embodiments, the widths of the PAL frequency bands in the first contiguous bandwidth and the second contiguous bandwidth is further compared (e.g., using the logic of Steps S505 to S508). In some embodiments, in addition to the type and the width of the frequency band, comparison factors for priority further include other factors (e.g., the concentration of the available frequency bands, or the available frequency band being closer to low frequency). These factors may be introduced for further comparison in Step S508 so as to replace the random determination of priority. Returning to FIG. 2, after determining the selected bandwidth as the working bandwidth of the base station and obtaining the available frequency band information of the selected bandwidth, the base station obtains the available frequency band in the selected bandwidth according to the available frequency band information of the selected bandwidth and selects one or more candidate frequency bands from the available frequency band in Step S203. In some embodiments, the base station may determine the candidate frequency band according to the priority of each available frequency band. For example, the available frequency band that is a PAL frequency band is prior to the available frequency band that is a GAA frequency band. If the two available frequency bands are both GAA frequency bands, the GAA frequency band with a wider bandwidth is prior to the GAA frequency band with a narrower bandwidth. In short, the detailed determination method of the priority of the available frequency band may be similar to the method in FIG. 5.

For example, an assumption is made that the spectrum resource configuration received from the SAS by the base station is the spectrum resource configuration #6 in Table 1, and the selected bandwidth is set to [3550, 3650]. At this time, the available frequency bands in the selected bandwidth [3550, 3650] include a frequency band [3550, 3560], a frequency band [3570, 3600], a frequency band [3600, 3640], and a frequency band [3640, 3670], wherein the frequency band [3550, 3560] is a PAL frequency band while the other frequency bands are GAA frequency bands. The base station may determine that the frequency band [3550, 3560] has the highest priority in response to the frequency band [3550, 3560] being a PAL frequency band. On the other hand, the base station may determine that the frequency band [3600, 3640] is prior to the frequency band [3570, 3600] and the frequency band [3640, 3670] in response to a width (40 MHz) of the frequency band [3600, 3640] being greater than a width (30 MHz) of the frequency band [3570, 3600] and a width (30 MHz) of the frequency band [3640, 3670]. Therefore, according to the prioritization, the available frequency band [3550, 3560], which is a PAL frequency band, may be set as a first candidate frequency band. The available frequency band [3600, 3640] having a width of 40 MHz may be set as a second candidate frequency band, and the available frequency bands [3570, 3600] and [3640,3 670] having a width of 30 MHz may be set as a third candidate frequency band and a fourth candidate frequency band respectively.

Further, in Step S204, the base station may configure the candidate frequency band to activate a bandwidth part (BWP) so that the user equipment (UE) served by the base station may reside in the base station through the candidate frequency band. In some embodiments, after the base station determines the candidate frequency bands including the first candidate frequency band and the second candidate frequency band, the base station selects the first candidate frequency band among the candidate frequency bands based on, for example, the priorities of the candidate frequency bands and configures the first candidate frequency band to activate the BWP so as to serve multiple user equipment. In order to avoid overload of the BWP caused by excessive user equipment residing in the BWP activated through the first candidate frequency band, the base station activates a BWP in the second candidate frequency band and switches a part of the user equipment from the first candidate frequency band to the second candidate frequency band in response to the number of the user equipment served through the first candidate frequency band being greater than a threshold. The threshold may be set according to the actual situations. For example, the threshold may be a width of a bandwidth in the first candidate frequency band, a ratio of the first candidate frequency band to the selected bandwidth, or an upper limit of the number of BWPs technically operable. In practice, the threshold may be, for example, 8 or 16. In some embodiments, the base station may determine whether the user equipment needs to be switched to the second candidate frequency band according to the time the user equipment resides in the base station through the first candidate frequency band. Specifically, an assumption is made that multiple user equipment including a first user equipment and a second user equipment reside in the base station through the first candidate frequency band. If the first user equipment resides in the base station through the first candidate frequency band for a longer time than the second user equipment residing in the base station through the first candidate frequency band, the base station may select the first user equipment out of the first user equipment and the second user equipment, and switch the first user equipment from the first candidate frequency band to the second candidate frequency band. In some embodiments, the base station may also determine the user equipment reconfigured to the second candidate frequency band according to other conditions such as, but not limited to, the type of the user equipment, the user's mobile package, and whether the user is an extranet or roaming user.

Figure 6:
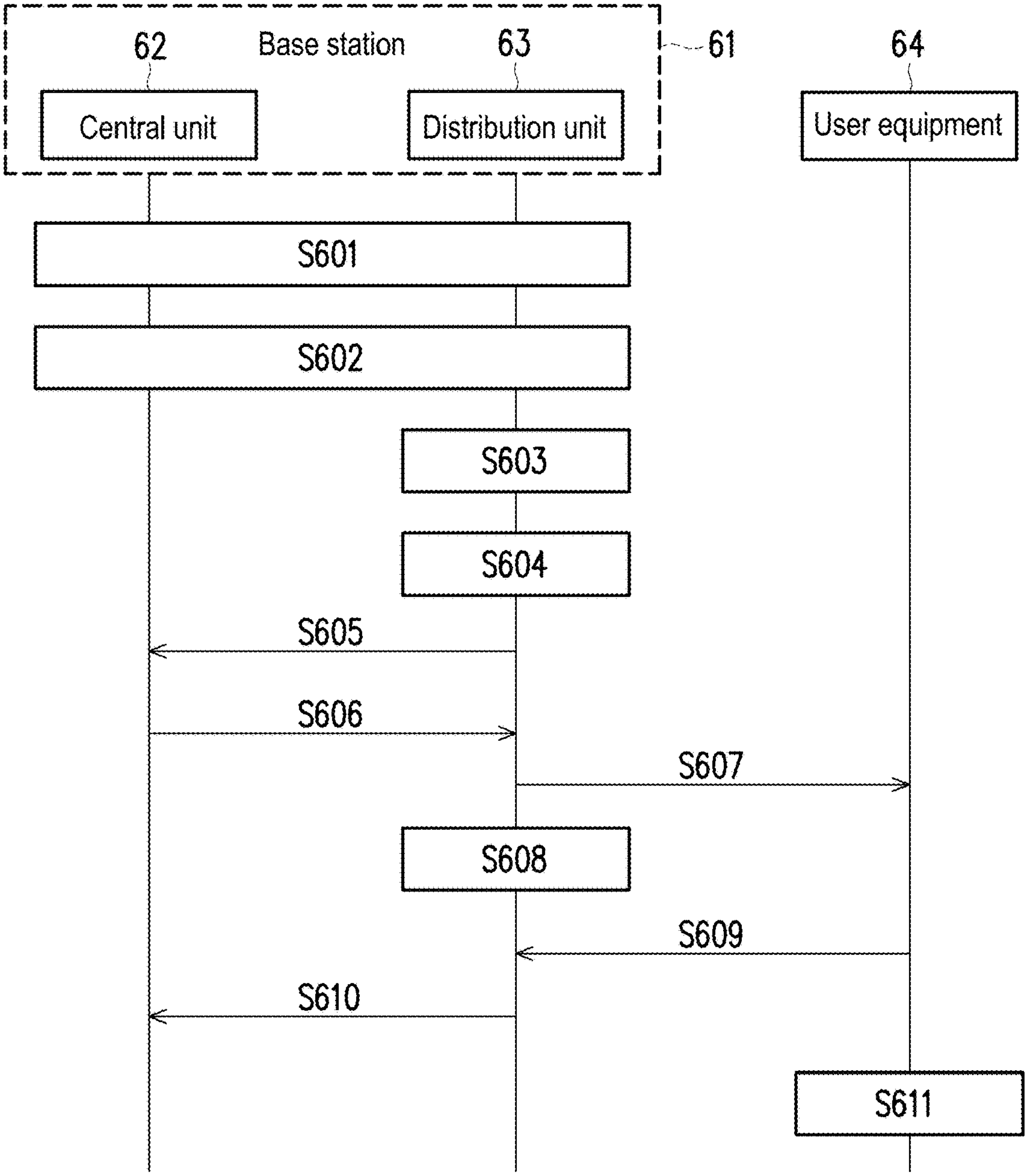
FIG. 6 shows a signaling diagram of switching a user equipment from a first candidate frequency band to a second candidate frequency band according to an embodiment of the disclosure.

FIG. 6 shows a signaling diagram of switching a user equipment from a first candidate frequency band to a second candidate frequency band according to an embodiment of the disclosure. The above-mentioned method may be performed by a base station 61, wherein the base station 61 includes a central unit 62 and a distribution unit 63. In some embodiments, the central unit 62 and the distribution unit 63 of the base station 61 may be operated through a software module or a hardware-related method. It is noted that FIG. 6 shows only one user equipment 64 exemplarily to facilitate the description. Though FIG. 6 shows only one user equipment 64, the disclosure does not intend to limit the number of user equipment that can be served by the base station.

In Step S601, the central unit 62 and the distribution unit 63 may exchange a signal in preparation for attaching the user equipment 64 to an initial BWP (hereinafter referred to as a "BWP 0") activated through the first candidate frequency band, thereby enabling the user equipment 64 to reside in the base station 61 through the first candidate frequency band (i.e., BWP 0). The central unit 62 or the distribution unit 63 may complete Step S601 through message signal such as RRC_RECFG, RRC_RECFG_COMPLETE, UE_CONTEXT_MODIFICATION_REQ, or UE_CONTEXT_MODIFICATION_RSP.

In Step S602, the central unit 62 and the distribution unit 63 determine that the user equipment 64 is successfully attached to the BWP 0. The central unit 62 and the distribution unit 63 may attach multiple other user equipment to the BWP 0 through an action similar to Step S601. Thus, when the multiple other user equipment is also successfully attached to the BWP 0, multiple user equipment may reside in the base station 61 through the first candidate frequency band at the same time.

In Step S603, the distribution unit 63 monitors the number of the multiple user equipment residing in the base station through the first candidate frequency band.

In Step S604, by monitoring, the distribution unit 63 determines whether the number of multiple user equipment residing in the base station 61 through the first candidate frequency band is greater than the threshold. If the number is greater than the threshold, it means that the BWP 0 is overloaded. Accordingly, the base station 61 may perform the following steps to switch the user equipment 64 to another BWP (i.e., the second candidate frequency band or a "BWP 1").

In Step S605, the distribution unit 63 transmits a user equipment configuration change request to the central unit 62. The user equipment configuration change request may include information for indicating the second candidate frequency band, wherein the information includes, for example, a first parameter firstActvBwp-Id corresponding to the second candidate frequency band. The distribution unit 63 may, for example, transmit the user equipment configuration change request to the central unit 62 through a message US_CONTEXT_MODIFICATION_RQRD. When the central unit 62 receives the user equipment configuration change request, the central unit 62 may, according to the above description (e.g., a residence time), select the user equipment 64 to be reconfigured to the second candidate frequency band from the multiple user equipment residing in the base station 61 through the first candidate frequency band. To facilitate the description, the user equipment 64 in FIG. 6 is (one of) the user equipment selected by the central unit 62 to be reconfigured to the second candidate frequency band.

In Step S606, the central unit 62 transmits a radio resource control (RRC) reconfiguration message RRC_RECFG to the distribution unit 63 according to the information. The RRC reconfiguration message is used to indicate the switching of the user equipment 64 to the second candidate frequency band.

In Step S607, the distribution unit 63 transfers the RRC reconfiguration message to the user equipment 64 through the first candidate frequency band.

In Step S608, the distribution unit 63 is switched to the second candidate frequency band to monitor the signals.

In step S609, the user equipment 64 may be switched so as to transmit a scheduling request (SR) to the distribution unit 63 through the second candidate frequency band (or the BWP 1 activated through the second candidate frequency band) in response to the RRC reconfiguration message. The distribution unit 63 may receive the scheduling request corresponding to the RRC reconfiguration message from the user equipment 64 through the second candidate frequency band.

In Step S610, in response to a determination that the scheduling request has been received, the distribution unit 63 transmits an RRC reconfiguration complete message RRC_RECFG_COMPLETE to the central unit 62, thereby switching the working frequency band of the user equipment 64 from the first candidate frequency band to the second candidate frequency band according to the scheduling request.

In Step S611, the user equipment 64 transmits and receives data using a radio resource of the second candidate frequency band (or the BWP 1).

Figure 7:
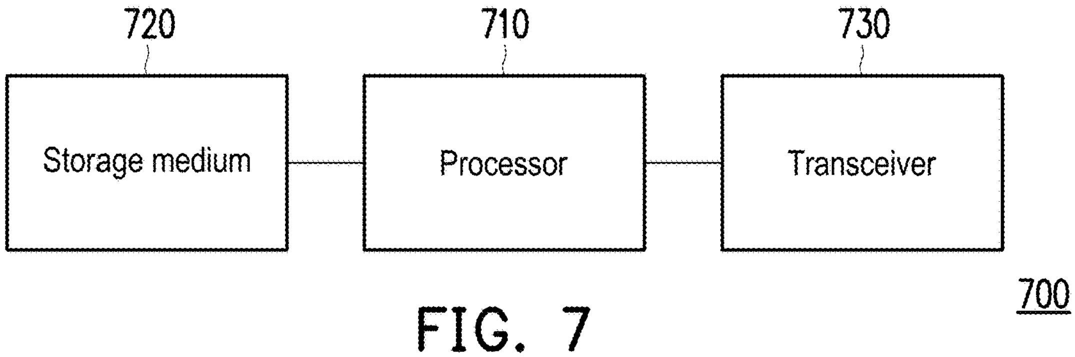
FIG. 7 shows a schematic diagram of a network node according to an embodiment of the disclosure.

FIG. 7 shows a schematic diagram of a network node 700 according to an embodiment of the disclosure. The network node 700 may be used to realize the functions of the base station, the central unit, or the distribution unit. The network node 700 includes a processor 710, a storage medium 720, and a transceiver 730.

The processor 710 is, for example, a central processing unit (CPU), or another programmable micro control unit (MCU) for general or special purposes, microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or another similar element or a combination of the above elements. The processor 710 may be coupled to the storage medium 720 and the transceiver 730. The processor 710 may also access and execute multiple modules and various applications stored in the storage medium 720.

The storage medium 720 is, for example, any type of fixed or removable random access memory (RAM), read-only memory (ROM), flash memory, hard disk drive (HDD), solid state drive (SSD), or a similar element or a combination of the above elements. The storage medium 720 is used to store the multiple modules or various applications that can be executed by the processor 710.

The transceiver 730 transmits and receives a signal through a wireless or wired method. The transceiver 730 may also perform operations such as low noise amplification, impedance matching, mixing, up or down frequency conversion, filtering, amplification, and the like.

Based on the above, a base station of the disclosure uses a sliding window to detect a spectrum resource to obtain multiple contiguous bandwidths from a CBRS spectrum. For the contiguous bandwidths, the base station may merge or truncate one or more available frequency bands in the contiguous bandwidth to obtain an available frequency band information of each contiguous bandwidth. Based on an optimized frequency selection strategy for PAL frequency bands and GAA frequency bands, the base station selects a working bandwidth of the base station from the contiguous bandwidths according to the available frequency band information, further selecting a frequency band having a higher priority from the working bandwidth as a candidate frequency band. The base station may configure the candidate frequency band and activate a bandwidth part to serve multiple user equipment. The base station of the disclosure may utilize an existing multi-part bandwidth technology of the 5G standard to realize the effective utilization of a CBRS spectrum resource, further reducing the costs of hardware and deployment of the base station, and in particular the costs of the disposition of 5G base stations, small cells or 5G customer premise equipment (CPE).

Finally, it should be noted that the foregoing embodiments are only used to describe the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A bandwidth selection method for a citizens broadband radio service, the bandwidth selection method being suitable for a base station and comprising:

receiving a spectrum resource configuration from a spectrum access system, wherein the spectrum resource configuration indicates at least one available frequency band, and the at least one available frequency band comprises a priority access licensed frequency band or a general authorized access frequency band;

determining a selected bandwidth in a spectrum of the citizens broadband radio service as a working bandwidth of the base station, wherein the selected bandwidth comprises a part or all of the available frequency band;

selecting a candidate frequency band from the available frequency band in the selected bandwidth, wherein the candidate frequency band is configured to activate a bandwidth part, wherein the available frequency band in the selected bandwidth comprises a first candidate frequency band and a second candidate frequency band;

selecting the first candidate frequency band, wherein the first candidate frequency band is configured to activate the bandwidth part to provide a service to a plurality of user equipment; and activating the bandwidth part in the second candidate frequency band and switching a first user equipment among the plurality of user equipment from the first candidate frequency band to the second candidate frequency band in response to a determination of a number of the plurality of user equipment served by the first candidate frequency band being greater than a threshold.

2. The bandwidth selection method according to claim 1, wherein determining the selected bandwidth as the working bandwidth of the base station comprises:

acquiring a plurality of contiguous bandwidths from the spectrum of the citizens broadband radio service according to a sliding window;

detecting each of the plurality of contiguous bandwidths according to the spectrum resource configuration to obtain an available frequency band information of each of the plurality of contiguous bandwidths, wherein the available frequency band information of each of the plurality of contiguous bandwidths indicates the available frequency band in each of the plurality of contiguous bandwidths;

selecting one of the plurality of contiguous bandwidths as the selected bandwidth according to the available frequency band information; and determining the available frequency band in the selected bandwidth according to the available frequency band information corresponding to the selected bandwidth.

3. The bandwidth selection method according to claim 2, wherein selecting one of the plurality of contiguous bandwidths as the selected bandwidth comprises:

selecting a first contiguous bandwidth from the plurality of contiguous bandwidths as the selected bandwidth in response to the available frequency band information, wherein a first available frequency band information corresponding to the first contiguous bandwidth indicates that the available frequency band in the first contiguous bandwidth comprises a first priority access licensed frequency band.

4. The bandwidth selection method according to claim 3, wherein the plurality of contiguous bandwidths further comprise a second contiguous bandwidth, and selecting the first contiguous bandwidth from the plurality of contiguous bandwidths as the selected bandwidth in response to the available frequency band information comprises:

comparing the first priority access licensed frequency band with a second priority access licensed frequency band in response to a second available frequency band information of the second contiguous bandwidth indicating that at least one available frequency band in the second contiguous bandwidth comprises the second priority access licensed frequency band; and selecting the first contiguous bandwidth as the selected bandwidth in response to a width of the first priority access licensed frequency band being greater than a width of the second priority access licensed frequency band.

5. The bandwidth selection method according to claim 2, wherein the plurality of contiguous bandwidths comprises a first contiguous bandwidth and a second contiguous bandwidth, and selecting one of the plurality of contiguous bandwidths as the selected bandwidth comprises:

selecting the first contiguous bandwidth from the plurality of contiguous bandwidths as the selected bandwidth in response to the available frequency band information, wherein a first available frequency band information corresponding to the first contiguous bandwidth indicates that the available frequency band in the first contiguous bandwidth comprises a first general authorized access frequency band, and a second available frequency band information corresponding to the second contiguous bandwidth indicates that the available frequency band in the second contiguous bandwidth comprises a second general authorized access frequency band, wherein a width of the first general authorized access frequency band is greater than a width of the second general authorized access frequency band.

6. The bandwidth selection method according to claim 2, wherein obtaining the available frequency band information of each of the plurality of contiguous bandwidths comprises:

determining that a first contiguous bandwidth of the contiguous bandwidth comprises a first available frequency band according to the spectrum resource configuration;

dividing the first available frequency band into a second available frequency band and a third available frequency band according to a default length in response to the first available frequency band and the default length being mismatched, wherein the default length is shorter than the first available frequency band; and determining the available frequency band information corresponding to the first contiguous bandwidth according to the second available frequency band and the third available frequency band.

7. The bandwidth selection method according to claim 2, wherein the available frequency band in the corresponding contiguous bandwidth indicated by the available frequency band information comprises at least one of:

a first available frequency band, wherein the first available frequency band partially overlaps the contiguous bandwidth; and a second available frequency band, wherein the second available frequency band is located in the contiguous bandwidth.

8. The bandwidth selection method according to claim 2, wherein the available frequency band comprises a first available frequency band and a second available frequency band, and detecting each of the plurality of contiguous bandwidths according to the spectrum resource configuration to obtain the available frequency band information of each of the plurality of contiguous bandwidths comprises:

reading a starting frequency and an ending frequency of a first contiguous bandwidth in the plurality of contiguous bandwidths;

obtaining a starting frequency and an ending frequency of the first available frequency band and the second available frequency band from the spectrum resource configuration; and determining whether the first available frequency band and the second available frequency band are located in the first contiguous bandwidth according to the starting frequency of the first contiguous bandwidth, the ending frequency of the first contiguous bandwidth, the starting frequency of the first available frequency band, and the starting frequency of the second available frequency band.

9. The bandwidth selection method according to claim 8, wherein the bandwidth selection method further comprising:

combining the first available frequency band with the second available frequency band to generate a third available frequency band in response to a determination of the first available frequency band and the second available frequency band being located in the first contiguous bandwidth and the ending frequency of the first available frequency band matching the starting frequency of the second available frequency band; and recording a starting frequency and an ending frequency of the third available frequency band in the available frequency band information corresponding to the first contiguous bandwidth.

10. The bandwidth selection method according to claim 8, wherein the bandwidth selection method further comprising:

determining that the first available frequency band is located in the first contiguous bandwidth in response to a determination of the starting frequency of the first available frequency band being between the starting frequency and the ending frequency of the first contiguous bandwidth;

updating the ending frequency of the first available frequency band to the ending frequency of the first contiguous bandwidth in response to a determination of the first available frequency band being located in the first contiguous bandwidth and the ending frequency of the first available frequency band being greater than the ending frequency of the first contiguous bandwidth; and recording a starting frequency and an ending frequency of the updated first available frequency band in the available frequency band information corresponding to the first contiguous bandwidth.

11. The bandwidth selection method according to claim 1, wherein a bandwidth of the first candidate frequency band is wider than a bandwidth of the second candidate frequency band, or the first candidate frequency band is the priority access licensed frequency band and the second candidate frequency band is the general authorized access frequency band.

12. The bandwidth selection method according to claim 1, wherein the base station comprises a central unit and a distribution unit, and switching the first user equipment among the plurality of user equipment from the first candidate frequency band to the second candidate frequency band comprises:

monitoring, through the distribution unit of the base station, the number of the plurality of user equipment residing in the base station through the first candidate frequency band;

transmitting, through the distribution unit, a user equipment configuration change request to the central unit in response to a determination of the number of the plurality of user equipment residing in the base station through the first candidate frequency band being greater than the threshold, wherein the user equipment configuration change request comprises an information indicating the second candidate frequency band;

transmitting, by the central unit, a message of a radio resource control reconfiguration to the distribution unit according to the information, wherein the message of the radio resource control reconfiguration indicates that the first user equipment is switched to the second candidate frequency band;

transferring, by the distribution unit, the message of the radio resource control reconfiguration to the first user equipment through the first candidate frequency band, and switching the first user equipment to the second candidate frequency band to receive a scheduling request, corresponding to the message of the radio resource control reconfiguration, from the first user equipment; and switching, by the distribution unit, the first user equipment from the first candidate frequency band to the second candidate frequency band so as to reside in the base station according to the scheduling request in response to a determination of the scheduling request being received.

13. The bandwidth selection method according to claim 1, wherein the plurality of user equipment further comprises a second user equipment, wherein a time of the first user equipment residing in the base station through the first candidate frequency band is longer than a time of the second user equipment residing in the base station through the first candidate frequency band.

14. A base station, comprising:

a transceiver, receiving a spectrum resource configuration from a spectrum access system, wherein the spectrum resource configuration indicates at least one available frequency band, and the at least one available frequency band comprises a priority access licensed frequency band or a general authorized access frequency band; and a processor, coupled to the transceiver and configured to:

determine a selected bandwidth in a spectrum of a citizens broadband radio service as a working bandwidth of the base station, wherein the selected bandwidth comprises a part or all of the available frequency band;

select a candidate frequency band from the available frequency band in the selected bandwidth, wherein the candidate frequency band is configured to activate a bandwidth part, wherein the available frequency band in the selected bandwidth comprises a first candidate frequency band and a second candidate frequency band;

select the first candidate frequency band, wherein the first candidate frequency band is configured to activate the bandwidth part to provide a service to a plurality of user equipment; and activate the bandwidth part in the second candidate frequency band and switch a first user equipment among the plurality of user equipment from the first candidate frequency band to the second candidate frequency band in response to a determination of a number of the plurality of user equipment served by the first candidate frequency band being greater than a threshold.

15. The base station according to claim 14, wherein the processor is further configured to:

acquire a plurality of contiguous bandwidths from the spectrum of the citizens broadband radio service according to a sliding window;

detect each of the plurality of contiguous bandwidths according to the spectrum resource configuration to obtain an available frequency band information of each of the plurality of contiguous bandwidths, wherein the available frequency band information of each of the plurality of contiguous bandwidths indicates the available frequency band in each of the plurality of contiguous bandwidths;

select one of the plurality of contiguous bandwidths as the selected bandwidth according to the available frequency band information; and determine the available frequency band in the selected bandwidth according to the available frequency band information corresponding to the selected bandwidth.

16. The base station according to claim 15, wherein the processor is further configured to:

select a first contiguous bandwidth from the plurality of contiguous bandwidths as the selected bandwidth in response to the available frequency band information, wherein a first available frequency band information corresponding to the first contiguous bandwidth indicates that the available frequency band in the first contiguous bandwidth comprises a first priority access licensed frequency band.

17. The base station according to claim 16, wherein the plurality of contiguous bandwidths further comprise a second contiguous bandwidth, and the processor is further configured to:

compare the first priority access licensed frequency band with a second priority access licensed frequency band in response to a second available frequency band information of the second contiguous bandwidth indicating that at least one available frequency band in the second contiguous bandwidth comprises the second priority access licensed frequency band; and select the first contiguous bandwidth as the selected bandwidth in response to a width of the first priority access licensed frequency band being greater than a width of the second priority access licensed frequency band.

18. The base station according to claim 15, wherein the plurality of contiguous bandwidths further comprise a first contiguous bandwidth and a second contiguous bandwidth, and the processor is further configured to:

select the first contiguous bandwidth from the plurality of contiguous bandwidths as the selected bandwidth in response to the available frequency band information, wherein a first available frequency band information corresponding to the first contiguous bandwidth indicates that the available frequency band in the first contiguous bandwidth comprises a first general authorized access frequency band, and a second available frequency band information corresponding to the second contiguous bandwidth indicates that the available frequency band in the second contiguous bandwidth comprises a second general authorized access frequency band, wherein a width of the first general authorized access frequency band is greater than a width of the second general authorized access frequency band.

19. The base station according to claim 15, wherein the processor is further configured to:

determine that a first contiguous bandwidth of the contiguous bandwidth comprises a first available frequency band according to the spectrum resource configuration;

divide the first available frequency band into a second available frequency band and a third available frequency band according to a default length in response to the first available frequency band and the default length being mismatched, wherein the default length is shorter than the first available frequency band; and determine the available frequency band information corresponding to the first contiguous bandwidth according to the second available frequency band and the third available frequency band.

20. The base station according to claim 15, wherein the available frequency band in the corresponding contiguous bandwidth indicated by the available frequency band information comprises at least one of:

a first available frequency band, wherein the first available frequency band partially overlaps the contiguous bandwidth; and a second available frequency band, wherein the second available frequency band is located in the contiguous bandwidth.

21. The base station according to claim 15, wherein the available frequency band comprises a first available frequency band and a second available frequency band, and the processor is further configured to:

read a starting frequency and an ending frequency of a first contiguous bandwidth in the plurality of contiguous bandwidths;

obtain a starting frequency and an ending frequency of the first available frequency band and the second available frequency band from the spectrum resource configuration; and determine whether the first available frequency band and the second available frequency band are located in the first contiguous bandwidth according to the starting frequency of the first contiguous bandwidth, the ending frequency of the first contiguous bandwidth, the starting frequency of the first available frequency band, and the starting frequency of the second available frequency band.

22. The base station according to claim 21, wherein the processor is further configured to:

combine the first available frequency band with the second available frequency band to generate a third available frequency band in response to a determination of the first available frequency band and the second available frequency band being located in the first contiguous bandwidth and the ending frequency of the first available frequency band matching the starting frequency of the second available frequency band; and record a starting frequency and an ending frequency of the third available frequency band in the available frequency band information corresponding to the first contiguous bandwidth.

23. The base station according to claim 21, wherein the processor is further configured to:

determine that the first available frequency band is located in the first contiguous bandwidth in response to a determination of the starting frequency of the first available frequency band being between the starting frequency and the ending frequency of the first contiguous bandwidth;

update the ending frequency of the first available frequency band to the ending frequency of the first contiguous bandwidth in response to a determination of the first available frequency band being located in the first contiguous bandwidth and the ending frequency of the first available frequency band being greater than the ending frequency of the first contiguous bandwidth; and record a starting frequency and an ending frequency of the updated first available frequency band in the available frequency band information corresponding to the first contiguous bandwidth.

24. The base station according to claim 14, wherein a bandwidth of the first candidate frequency band is wider than a bandwidth of the second candidate frequency band, or the first candidate frequency band is the priority access licensed frequency band and the second candidate frequency band is the general authorized access frequency band.

25. The base station according to claim 14, wherein the base station further comprises a central unit and a distribution unit, the base station being configured to:

monitor, through the distribution unit of the base station, the number of the plurality of user equipment residing in the base station through the first candidate frequency band;

transmit, through the distribution unit, a user equipment configuration change request to the central unit in response to a determination of the number of the plurality of user equipment residing in the base station through the first candidate frequency band being greater than the threshold, wherein the user equipment configuration change request comprises an information indicating the second candidate frequency band;

transmit, by the central unit, a message of a radio resource control reconfiguration to the distribution unit according to the information, wherein the message of the radio resource control reconfiguration indicates that the first user equipment is switched to the second candidate frequency band;

transfer, by the distribution unit, the message of the radio resource control reconfiguration to the first user equipment through the first candidate frequency band, and switch the first user equipment to the second candidate frequency band to receive a scheduling request, corresponding to the message of the radio resource control reconfiguration, from the first user equipment; and switch, by the distribution unit, the first user equipment from the first candidate frequency band to the second candidate frequency band so as to reside in the base station according to the scheduling request in response to a determination of the scheduling request being received.

26. The base station according to claim 14, wherein the plurality of user equipment further comprises a second user equipment, wherein a time of the first user equipment residing in the base station through the first candidate frequency band is longer than a time of the second user equipment residing in the base station through the first candidate frequency band.

* * * * *